Patented May 13, 1924.

1,493,577

UNITED STATES PATENT OFFICE.

HERMANN WAGNER, OF HOECHST-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

AZO DYESTUFFS AND PROCESS OF MAKING SAME.

No Drawing. Application filed June 30, 1922. Serial No. 572,039.

*To all whom it may concern:*

Be it known that I, HERMANN WAGNER, a citizen of Germany, residing at Hoechst-on-the Main, Germany, have invented certain new and useful Improvements in Azo Dyestuffs and Processes of Making Same, of which the following is a specification.

I have found that dyestuffs of excellent fastness to kier-boiling are obtained by combining any diazo-compound with the 4-chloro-3-toluidide or the 4-bromo-3-toluidide of 2.3-oxynaphthoic acid. The fastness to kier-boiling of such dyestuffs as compared with that of dyestuffs of similar composition is of such superiority, that they are predestined to open new methods in the manufacture of colored fabrics. The dyestuffs containing halogen in both components are distinguished by particularly excellent qualities.

The following examples illustrate my invention:

The material is treated with—

1. *Padding liquor:* 23 grams 2.3-oxynaphthoic acid-4-chloro-3-toluidide, 20 grams para soap PN, 60 ccm. caustic soda lye of 22° Bé., made up to 1 litre with boiling water then it is dried and printed with the following

*Printing paste:* 14.1 grams 6-chloro-2-toluidine, 26 grams hydrochloric acid of 22° Bé., 170 grams hot water, cool with ice, and add 7 grams sodium nitrite dissolved in 50 ccm. of water, made up to 500 grams; thicken this solution with 480 grams tragacanth (60:1000) and before use add 20 grams sodium acetate, giving 1 kilo of printing paste. A bright scarlet tint is obtained on the fibre.

2. *Padding liquor* as described in Example 1 and

*Printing paste:* 14.1 grams 5-chloro-2-toluidine and the other ingredients as specified in Example 1; in this case a red tint with a bluish hue is obtained.

3. *Padding liquor* as described in Example 1 and

*Printing paste:* 14.1 grams 4-chloro-2-toluidine and the other ingredients as specified in Example 1; in this case a deep red tint is obtained.

4. *Padding liquor* as described in Example 1 and

*Printing paste:* 14.1 grams 4-chloro-3-toluidine and the other ingredients as specified in Example 1; in this case a deep red tint is obtained.

5. *Padding liquor* as described in Example 1 and a

*Printing paste:* 18.6 grams 4-bromo-2-toluidine and the other ingredients as specified in Example 1.

6. *Padding liquor* as described in Example 1.

*Printing paste:* 15.7 grams 4-chloro-2-anisidine and the other ingredients as specified in Example 1; in this case a claret-red tint with a yellow hue is obtained.

7. *Padding liquor:* 27 grams 2.3-oxynaphthoic acid-4-bromo-3-toluidide, 20 grams para soap PN. 60 grams caustic soda lye of 22° Bé. made up to 1 litre with boiling water.

*Printing paste:* 14.1 grams 6-chloro-2-toluidine and the other ingredients as specified in Example 1; in this case a bright scarlet tint is obtained.

8. *Padding liquor* as described in Example 7.

*Printing paste:* 14.1 grams 5-chloro-2-toluidine and the other ingredients as specified in Example 1; in this case a red tint is obtained.

9. *Padding liquor* as described in Example 7.

*Printing paste:* 14.1 grams 4-chloro-2-toluidine and the other ingredients as specified in Example 1; in this case a red tint with a faint blue hue is obtained.

10. *Padding liquor* as described in Example 7.

*Printing paste:* 15.7 grams 4-chloro-2-anisidine and the other ingredients as specified in Example 1; in this case a claret-red tint with a yellow hue is obtained.

11. *Padding liquor* as described in Example 7.

*Printing paste:* 14.1 grams of 4-chloro-3-toluidine and the other ingredients as specified in Example 1.

12. *Padding liquor* as described in Example 7.

*Printing paste:* 18.6 grams 4-bromo-2-toluidine and the other ingredients as specified in Example 1.

All prints obtained by means of the above mentioned solutions and printing pastes possess very great fastness to kier-boiling and to light.

Having now described my invention what I claim is:

As new products, the azo dyestuffs of the general formula

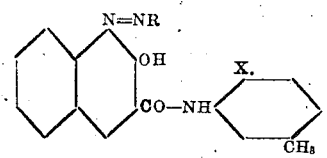

wherein R stands for one of the residues of the halogenated mononuclear methyl and methoxy substituted aromatic hydrocarbons and X stands for one of the halogens, chlorine and bromine, which products yield, when reduced with stannous chloride and hydrochloric acid, a halogenated substituted aromatic amine and a toluidide of the 1-amino-2-oxy-3-naphthoic acid.

In testimony whereof I affix my signature.

HERMANN WAGNER.